United States Patent [19]

Horton et al.

[11] Patent Number: 5,200,204
[45] Date of Patent: Apr. 6, 1993

[54] ROTARY EXTRUDER WITH INTEGRAL AUGER FEED ASSEMBLY

[75] Inventors: Douglas J. Horton; Richard L. Abner, Jr., both of Big Spring, Tex.

[73] Assignee: Permian Research Corporation, Big Spring, Tex.

[21] Appl. No.: 667,532

[22] Filed: Mar. 11, 1991

[51] Int. Cl.$^5$ .................................. B29C 47/00
[52] U.S. Cl. .................................. 425/188; 366/99; 425/192 R; 425/203; 425/381.2
[58] Field of Search .................. 366/69, 96, 97, 98, 366/99; 264/211.1, 211.12, 211.23, 349; 425/203, 204, 205, 381.2, 190, 191, 192 R, 185, 188

[56] References Cited

U.S. PATENT DOCUMENTS

| | | | |
|---|---|---|---|
| 3,966,177 | 6/1976 | Lagoutte et al. | 366/98 |
| 4,194,841 | 3/1980 | Tadmor | 366/97 |
| 4,255,059 | 3/1981 | Hold et al. | 366/97 |
| 4,329,065 | 5/1982 | Hold et al. | 366/97 |
| 4,413,913 | 11/1983 | Hold et al. | 366/99 |
| 4,529,320 | 7/1985 | Mehra et al. | 366/99 |
| 4,529,478 | 7/1985 | Mehta et al. | 366/97 |
| 4,549,810 | 10/1985 | Mehta | 366/99 |
| 4,582,433 | 4/1986 | Mehta | 366/99 |
| 4,606,646 | 8/1986 | Mehta et al. | 366/99 |
| 4,652,224 | 3/1987 | Golisch | 425/188 |

Primary Examiner—David A. Simmons
Assistant Examiner—William J. Matney, Jr.
Attorney, Agent, or Firm—Ross, Howison, Clapp & Korn

[57] ABSTRACT

A rotary extruder having an integral auger feed assembly operatively connected to the extruder barrel, the auger feed assembly being adapted to introduce feed material directly into the annular space between the rotor and barrel of the rotor extruder. The apparatus is particularly useful for feeding low bulk density feed materials to a rotary extruder.

4 Claims, 4 Drawing Sheets

ROTARY EXTRUDER WITH INTEGRAL AUGER FEED ASSEMBLY

BACKGROUND OF THE INVENTION

1. Field of the Invention

This invention relates to rotary extruders, and more particularly, to rotary extruders having an integral auger feed mechanism.

2. Description of the Prior Art

Rotary extruders are well known, having previously been disclosed, for example, in U.S. Pat. Nos. 3,880,564; 4,012,477; 4,501,543; 4,813,863; and 4,887,907. As used herein, the term "rotary extruder" refers to an extruder having a barrel section with an eccentric bore and a rotor rotatably mounted within the bore that comprises a substantially cylindrical plasticizing surface.

Unlike conventional screw-type extruders, which are typically "flood fed", rotary extruders have heretofore been operated in a "starve fed" manner. In the rotary extruders previously known, the feed material, preferably comprising a major portion of a polymeric resin, is fed downwardly through a feed port by gravity flow into an annulus defined by the plasticizing surface of cylindrical rotor and the inwardly facing surface of the surrounding barrel. The polymer is carried into the annulus from the feed port by the rotational motion of the rotor. A thin coating of plasticized polymer on the rotor surface aids in carrying the unplasticized polymer into the annulus.

Although the rotary extruders previously disclosed have been satisfactorily used for extruding many polymeric materials, difficulties have been encountered when attempting to increase feed rates. Efforts to increase the feed rate in conventional rotary extruders have sometimes led to clumping or polymer buildup in the feed section, often caused by polymer sticking to hot surfaces around the feed port. This can in turn cause surging and thermal degradation. Attempts to avoid clumping or sticking of feed material inside the feed port through use of a cooled insert in the feed port have also met with difficulties due to the intricate geometries involved, resulting thermal expansion differences, and other polymer feed restrictions. Enlarging the feed port of conventional rotary extruders to increase the flow area can cause undesirable weakening of the barrel.

Difficulties have also been encountered in venting gases when feeding low bulk density or "fluffy" materials into conventional rotary extruders in that the incoming materials tend to be suspended by the exiting gases. Other problems have been encountered in feeding non freeflowing materials such as additives, some pigments and the like that are likely to clump in the feed port.

The sequential use of conventional screw-type extruders in two-stage extrusion processes is well known, being disclosed, for example, in U.S. Pat. No. 4,863,653. The use of augers for controlling the rate at which material is supplied to the feed ports of conventional extruders for gravitational feeding is also known, being disclosed for example in U.S. Pat. No. 4,022,440.

U.S. Pat. No. 4,124,307 discloses a homogenizer for composite viscous materials in which a highly viscous mass to be homogenized is fed from a screw plasticizer into a mixing chamber perpendicular to the plasticizer mouth. A mandrel rotates independently of the plasticizer screw in the plasticizer mouth to masticate the mass in a narrow annular clearance between itself and the chamber wall.

SUMMARY OF THE INVENTION

The foregoing problems have now been overcome by means of a rotary extruder having an integral auger feed assembly as disclosed herein. As used herein, the term "integral" means that the auger feed assembly is connected to the barrel of a rotary extruder and discharges directly into the annulus between the barrel and the rotor.

According to a preferred embodiment of the invention, the apparatus of the invention comprises a rotary extruder having an integral auger feed assembly mounted on the exterior wall of the extruder barrel. The auger is desirably housed within a barrel that is at least partially thermally isolated from the rotary extruder barrel to reduce melting and sticking of polymer within the feed assembly. According to a particularly preferred embodiment of the invention, the auger barrel is water cooled. With this design, difficulties previously encountered in building intricately shaped, cooled feed ports are eliminated.

The speed of the auger or screw is controlled to regulate the delivery rate of material to the extruder. Vents through the extruder wall are desirably provided upstream from the feed port to permit volatiles to be continuously vented while supplying polymeric material to the rotary extruder at a constant feed rate. If desired, vacuum equipment can be installed over the vents to aid in removing volatiles without interrupting feed to the extruder. A smaller feed port is required to achieve a desired feed rate than was necessary with the conventional extruders of the prior art.

The rotary extruder and integral auger feed assembly disclosed herein can be located at any low pressure area on the perimeter of the rotary extruder barrel. A plurality of integral auger feed assemblies can be circumferentially spaced around the barrel for use in feeding additives to the polymeric melt. Also, because the forced auger feed system can be totally enclosed, the extruder can be operated in an inert environment, thereby reducing the effects of oxidation on the polymer.

According to another preferred embodiment of the invention, a rotary extruder is disclosed that comprises a conventional feed chute for use in feeding relatively high bulk density material in combination with an integral auger feed assembly for use in feeding relatively low bulk density material to the extruder.

BRIEF DESCRIPTION OF DRAWINGS

The apparatus of the invention is further described and explained in relation to the following drawings in which.

DESCRIPTION OF THE PREFERRED EMBODIMENTS

The apparatus of the invention particularly relates to rotary extruders as previously defined herein. Criteria generally relating to the design and construction of such extruders are discussed more fully in U.S. Pat. Nos. 4,501,543, 4,813,863 and 4,887,907, which are incorporated by reference herein.

Figure 1:
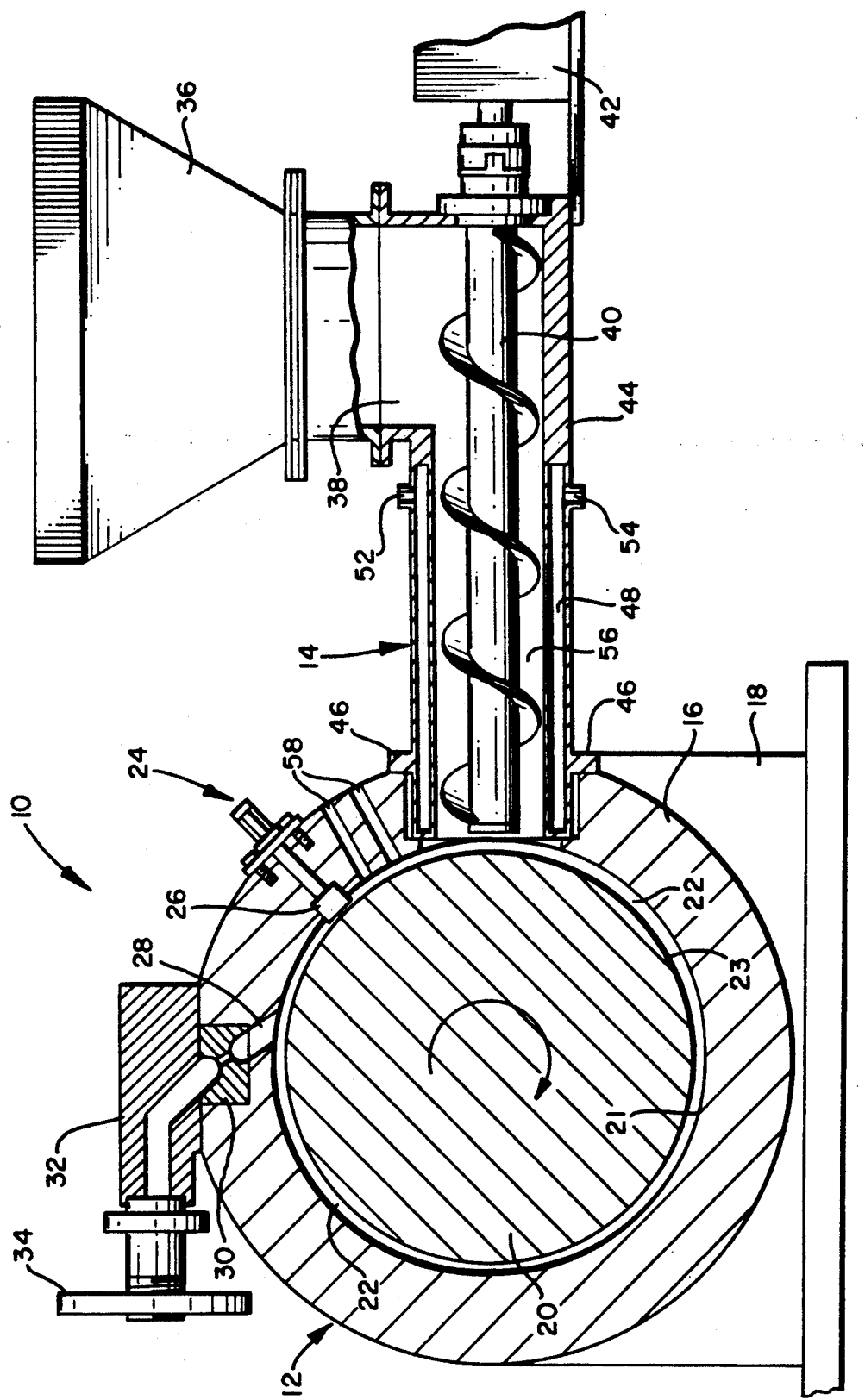
FIG. 1 is a simplified elevational view, partially in section, of a rotary extruder comprising an integral auger feed assembly as disclosed herein.

Referring to FIG. 1, the apparatus newly disclosed herein is extrusion device 10 comprising rotary extruder 12 and integral auger feeder assembly 14. Rotary extruder 12 preferably further comprises barrel 16 mounted on base 18. Rotor 20 is rotatably mounted inside eccentric bore 21, defining annulus 22. Although rotary extruder 12 is shown in cross-section in FIGS. 1 and 2, it is understood that plasticizing surface 23 of rotor 20 desirably extends longitudinally for a distance significantly greater than the diameter of barrel 44 of integral auger feeder assembly 14, and barrel 44 is preferably longitudinally centered on barrel 16 at the longitudinal midpoint of plasticizing surface 23.

Restrictor bar assembly 24 comprising restrictor bar 26 is adjustable so as to control the clearance between restrictor bar 26 and plasticizing surface 23 of rotary extruder 12 as desired. By adjusting the clearance between restrictor bar 26 and plasticizing surface 23, it is possible to control the amount of plasticized material discharged from rotary extruder 12 through outlet 28. Outlet 28 in barrel 16 communicates with discharge manifold 32 through discharge orifice block 30 disposed in a recess in barrel 16. Flange 34 is provided for connecting rotary extruder 12 to other downstream equipment.

Integral auger feeder assembly 14 preferably comprises hopper 36 or other similarly effective means adapted to supply feed material such as a polymeric resin through inlet 38 into barrel 44. Barrel 44 comprises longitudinal bore 56 having auger 40 disposed therein. Auger 40 is adapted to be rotated at a desired speed by drive means 42 such as an electric motor or the like. The end of barrel 44 opposite inlet 38 desirably extends into a counterbore in barrel 16 of rotary extruder 12. Barrel 44 is preferably connected to barrel 16 by flange 46. The preferred means for operatively connecting integral auger feeder assembly 14 to rotary extruder 12 is further described below in relation to FIG. 2. The portion of barrel 44 that extends from inlet 38 to the opposite end is desirably double-walled to permit circulation of a cooling medium through annular space 48, although it is understood that other similarly effective means for controlling the temperature of barrel 44 can also be used within the scope of the invention. Cooling barrel 44 in this manner will reduce heat buildup inside integral auger feed assembly 14 that might otherwise cause polymer sticking. Inlet 52 and outlet 54 are provided for the ingress and egress, respectively, of a cooling medium such as water.

Figure 2:
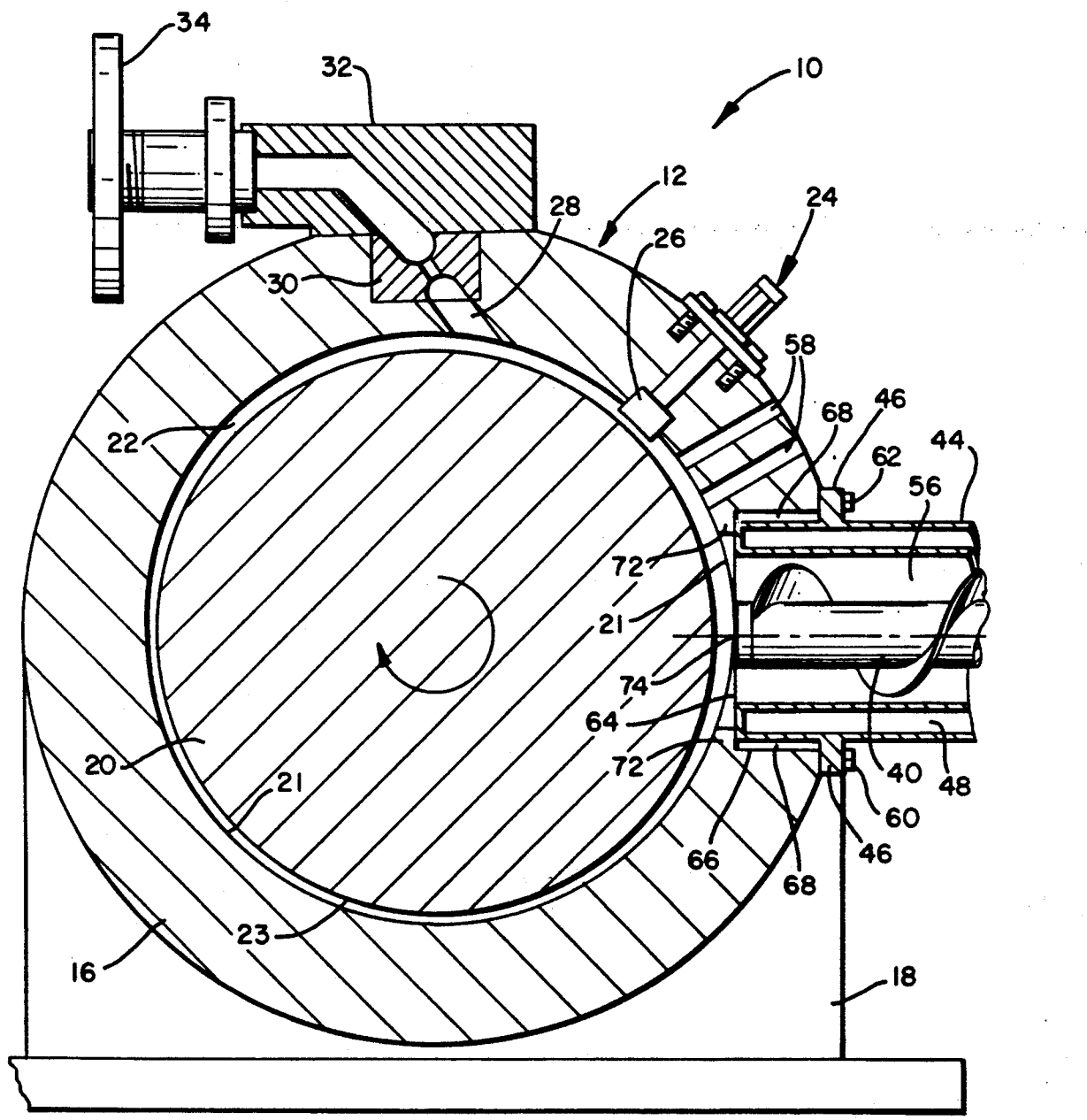
FIG. 2 is an enlarged detail view depicting in greater detail the means for operatively connecting the auger feed assembly to the rotary extruder barrel.

Referring to FIG. 2, counterbore 66 in barrel 16 communicates with annulus 22, is preferably slightly larger in diameter for most of its length than the outside diameter of barrel 44, and is preferably centered longitudinally in barrel 16 opposite the midpoint of plasticizing surface 23 of rotor 20. Counterbore 66 communicates with annulus 22 between rotor 20 and barrel 16, and is preferably stepped radially inward near bore 21 to form annular shoulder 72 that abuts end wall 62 of barrel 44. It is understood, of course, that additional sealing means such as gaskets or the like (not shown) can be used between shoulder 72 and end wall 62 to reduce polymer leakage therebetween.

Barrel 44 is preferably centered in counterbore 66 and connected to barrel 16 by bolts 60, 62 extending through flange 46. Although only two such bolts are visible in the sectional view shown in FIG. 2, it is understood that a plurality of other such circumferentially spaced bolts are preferred for use in connecting barrel 44 to barrel 16.

Because the diameter of counterbore 66 is slightly larger than the outside diameter of barrel 44, annular air space 68 is provided therebetween. Annular air space 68 functions as a thermally insulative means that limits conductive heat transfer between barrel 16 and barrel 44. Limiting heat transfer from barrel 16 to barrel 44 is desirable in order to maintain the temperature of barrel 16 in the plasticizing temperature range of the material being extruded while simultaneously holding the temperature of barrel 44 at a level that is cool enough to limit sticking or plugging inside bore 56. It will be understood, of course that a thermally insulative packing material (not shown) can also be inserted provided inside annular air space 68 if desired to further limit heat transfer. Where a gasket is used to limit leakage between annular shoulder 72 and end wall 64, the material from which such gasket is made can also be selected to reduce conductive heat transfer between those members.

End wall 64 of barrel 44 is preferably aligned by annular shoulder 72 and flange 46 to a position that is substantially tangential to eccentric bore 21, and free end 74 of auger 40 desirably extends almost to the end of barrel 44. Vent passages 58 are preferably provided just above the point where barrel 44 enters barrel 16 for use in venting volatile matter from feed introduced into annulus 22 from bore 56. The use of vent passages 58 is especially preferred when the feed material comprises low bulk density matter such as, for example, recycled foamed polystyrene, powders, finely divided pigments, or the like, which may contain significant quantities of entrained gasses.

The operation of extrusion device 10 is further described and explained with reference to FIGS. 1 and 2. Feed material, preferably comprising a major portion of a polymeric resin, together with such other ingredients or additives as may be desired, is introduced through feed hopper 36 and inlet 38 into longitudinal bore 56 of barrel 44. As auger 44 is rotated by drive means 42, the feed material is conveyed through bore 56 and discharged into annulus 22 of rotary extruder 12. While the feed material is passing through bore 56, barrel 44 is cooled by cooling water circulated through annulus 48. Once inside rotary extruder 12, the feed material is plasticized by the rotation of rotor 20 inside barrel 16, and is then discharged through outlet 28 and discharge manifold 32 to other downstream handling equipment.

Figure 3:
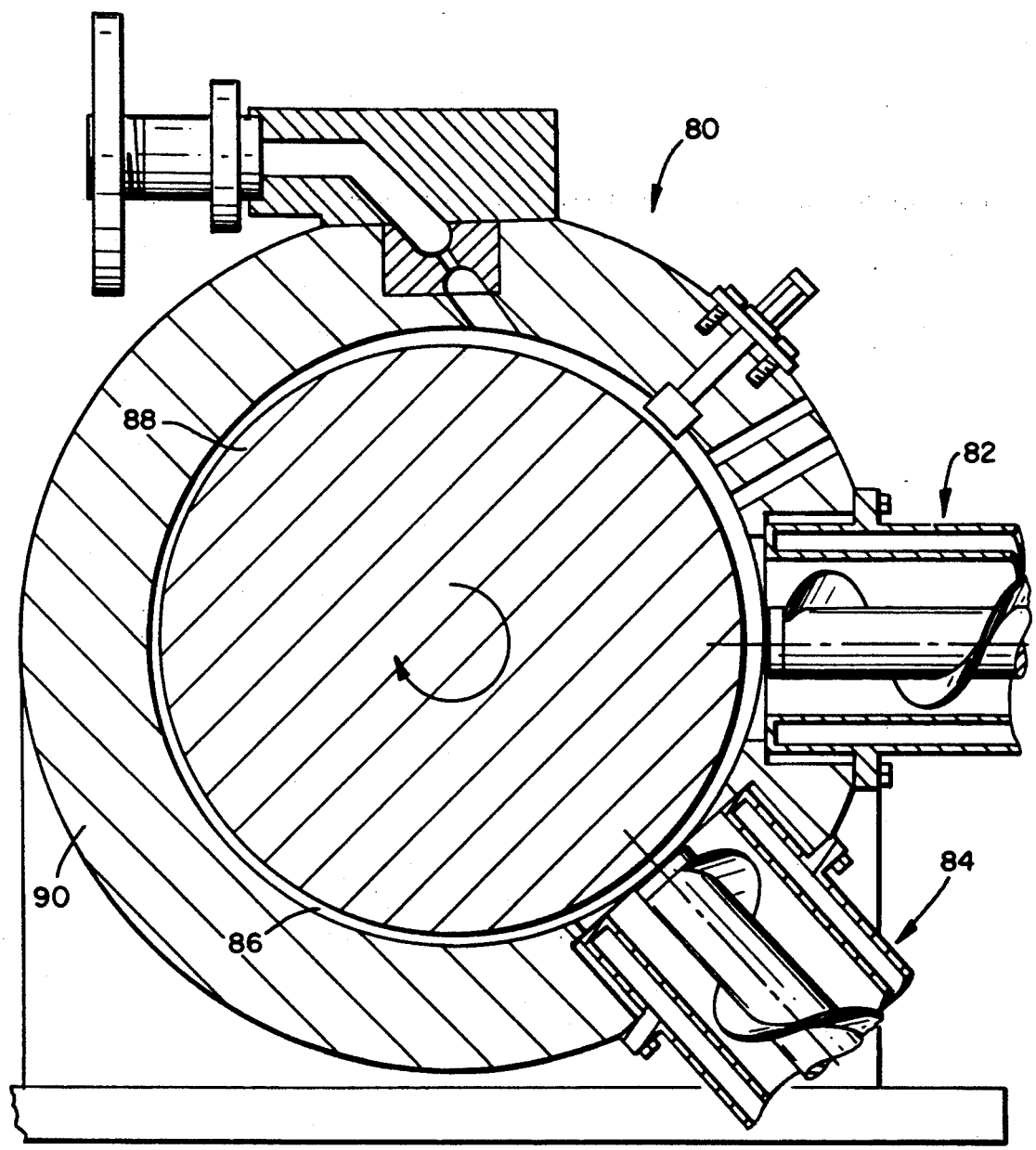
FIG. 3 is an enlarged detail view as in FIG. 2, but showing the embodiment of the invention in which more than one integral auger feed assembly is operatively connected to the rotary extruder barrel.

According to another embodiment of the invention, as shown in FIG. 3, a plurality of integral auger feed assemblies as described above can be provided if desired to facilitate the sequential introduction of various feed materials into a rotary extruder. Referring to FIG. 3, integral auger feed assemblies 82, 84 are circumferentially spaced, and are each adapted to discharge feed material into annulus 86 between rotor 88 and barrel 90 of rotary extruder 80.

Figure 4:
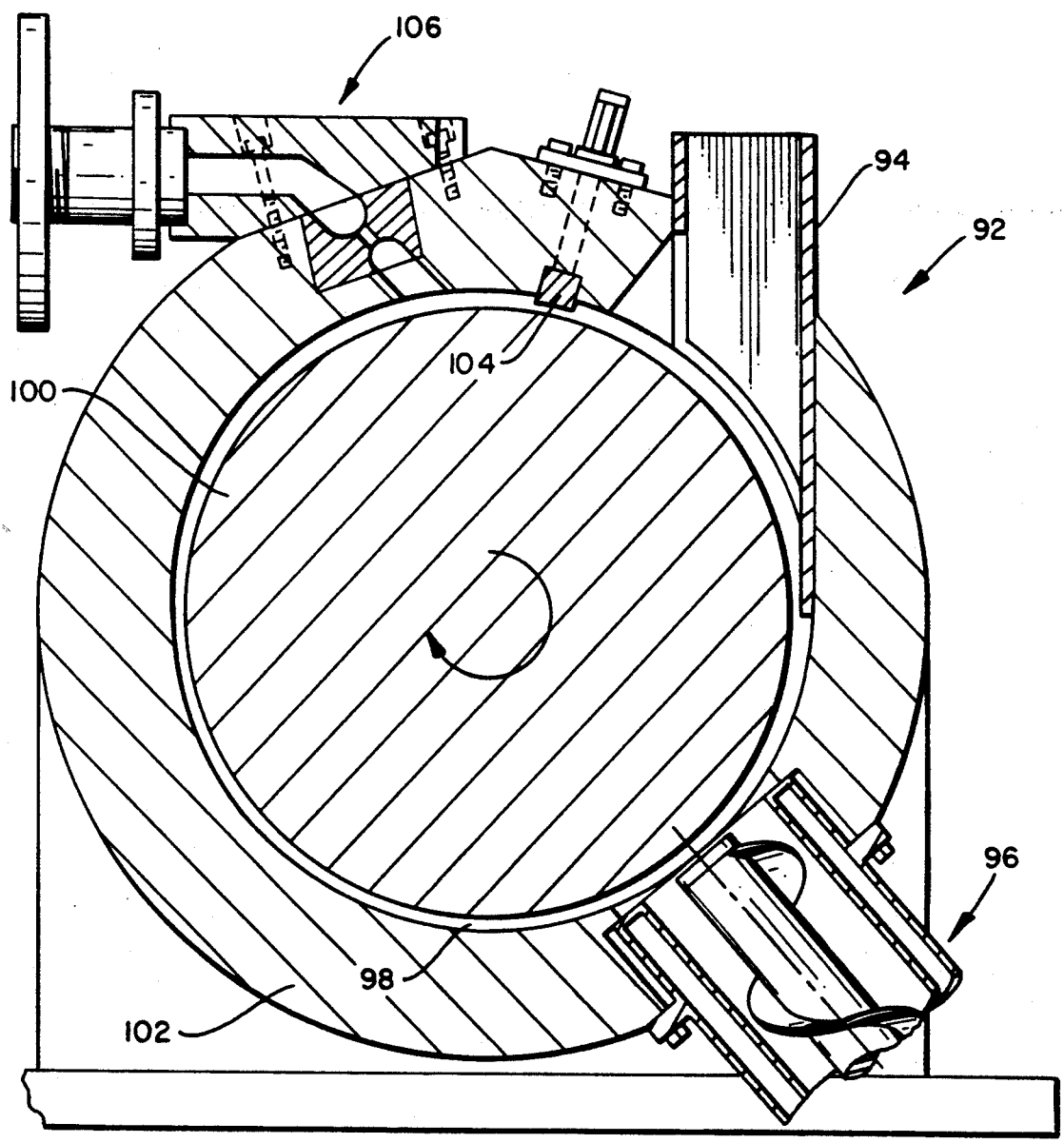
FIG. 4 is an enlarged detail view depicting the embodiment of the invention wherein a rotary extruder comprises a conventional, gravity feed port in combination with an integral auger feed assembly.

According to another embodiment of the invention, as shown in FIG. 4, an integral auger feed assembly as described above is provided in combination with a conventional feed port to facilitate feeding both low and high bulk density materials into a rotary extruder. Referring to FIG. 4, rotary extruder 92 comprises conventional (gravity flow) feed inlet 94 and circumferentially spaced, integral auger feed assembly 96 as described above. Each feed mechanism is adapted to discharge feed material into annulus 98 between rotor 100 and barrel 102 of rotary extruder 92. In this embodiment of the invention, restrictor bar 104 is preferably situated between inlet port 94 and discharge assembly 106. With the apparatus disclosed in FIG. 4, relatively high bulk density materials can be fed to rotary extruder 92 by gravitational flow, and relatively low bulk density materials that are difficult to feed gravitationally are fed (either simultaneously or sequentially) to rotary extruder 92 through integral auger feed assembly 96.

Other alterations and modifications of the invention disclosed herein will likewise become apparent to those of ordinary skill in the art upon reading this disclosure, and it is intended that the scope of the invention be limited only by the broadest interpretation of the appended claims to which the inventor may be legally entitled.

We claim:

1. An extrusion device comprising:

a rotary extruder having a barrel with an eccentric bore, a rotor with a continuous cylindrical surface rotatably mounted within the bore, defining an annulus between the rotor and the eccentric bore; and an integral auger feed assembly having a barrel member with a longitudinal bore communicating in perpendicular relation with the annulus, an auger rotatably mounted within the longitudinal bore, and means for limiting heat transfer between the barrel of the rotary extruder and the barrel member.

2. The extrusion device of claim 1 wherein the barrel of the rotary extruder further comprises at least one vent passage disposed above that portion of the annulus into which auger discharges feed material, the vent passage being adapted to vent volatile matter from the barrel of the rotary extruder.

3. The extrusion device of claim 1 comprising a plurality of circumferentially spaced integral auger feed assemblies.

4. The extrusion device of claim 1 further comprising at least one feed port in the barrel adapted to supply feed material to the annulus of said rotary extruder by gravity flow.

* * * * *